July 19, 1949.   T. W. WATKINS, SR   2,476,934
FISH LURE
Filed April 22, 1946
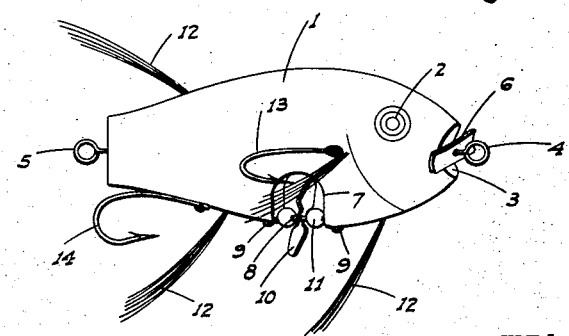
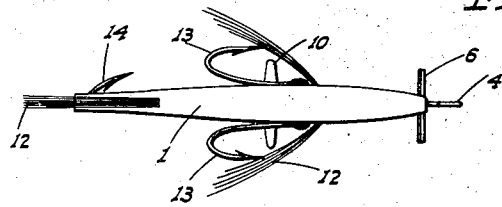
INVENTOR.
Thomas W. Watkins Sr
BY
ATTYS Patented July 19, 1949

2,476,934

UNITED STATES PATENT OFFICE 2,476,934

FISH LURE

Thomas W. Watkins, Sr., Oroville, Calif.

Application April 22, 1946, Serial No. 663,878

1 Claim. (Cl. 43—42.09)

This invention is directed to, and it is an object to provide, a fish lure for casting or trolling; the lure being designed to closely simulate the shape and appearance, as well as motion, of a natural bait, such as a live minnow.

Another object of the invention is to provide an artificial-fish lure, as above, which includes a body which is balanced so that it maintains a lifelike position in the water; a feature advantageous to successful luring of fish.

A further object of this invention is to provide a fish lure having a novel arrangement of tufts or hackles thereon in simulation of the fins and tail of the bait fish represented by the lure; certain of such tufts or hackles being disposed in a manner to fend weeds, moss, and similar obstructions from hooks mounted on the body in forwardly opening positions.

An additional object of the invention is to provide a fish lure, of the artificial-fish type, which includes a spinner, in novel assembly with the body of the lure.

A further object of the invention is to provide a practical, durable and simplified lure, and yet one which will be exceedingly effective for the purpose for which it is designed.

These objects are accomplished by means of such structure and relative arrangement of parts as will fully appear by a perusal of the following specification and claim.

In the drawings:

Fig. 1 is an elevation of the lure, including both the wobble plate and spinner.

Fig. 2 is a plan view of such lure.

Referring now more particularly to the characters of reference on the drawings, and at present to Figs. 1 and 2, the artificial-fish lure comprises a body 1 of a form and size closely simulating the body of a natural bait fish, such as bluegill, sun-fish, crappie, calico-bass, rock-bass, goldfish, silver-fish, or carp.

The body 1 is of wood, plastic, or other suitable material, and is finished, on the exterior, in a manner to represent coloring, scales, etc., of the natural fish of which the lure is a representation; the body including, on opposite sides of the head thereof, an artificial, natural appearing eye 2.

At the forward end of the head of the body 1 the same is V-notched, as at 3, to represent the mouth of the lure; such notch opening forwardly and being relatively wide angle. A relatively small screw eye 4 is attached to the body in the notch 3 thereof, and said eye 4 is intended for attachment to the leader of the fishing tackle, which leader preferably includes a conventional swivel.

At the rear end the body 1 is provided with another relatively small screw eye 5 to which a trailing hook (not shown) of single or multiple barb, and feathered or baited, may be attached.

If a wobbling action of the lure as it moves through the water is desired, a transversely extending wobble plate 6 is affixed in the notch 3 at the front of the body; said wobble plate being concave on its face, as shown.

The wobble plate 6 is held in place by the screw eye 4.

Intermediate its ends the body 1 is formed with an inverted U-shaped notch 7 in the belly portion of said body, with said notch opening to the lower edge of the latter.

A longitudinally extending wire 8 extends across the notch 7 at its lower end and is attached to the body, as at 9, by small screws or tacks. A spinner 10 is mounted on the wire 8 for rotation through the notch 7; the proper positioning of said spinner being maintained by beads 11 on the wire 8 on opposite sides of said spinner. The spinner serves to attract the attention of game fish as the lure passes through the water. As will be clearly seen from Fig. 2, the diameter of the spinner is considerably greater than the width of the body so that as the spinner rotates, it will intermittently project outwardly of the sides of the body. This will enhance its attention-attracting action as will be evident.

The body 1 is fitted with a plurality of flexible and resilient tufts or hackles 12 formed of horse hair, feathers, or the like; certain of said tufts 12 representing the fins of the fish, while other of said tufts represent the tail. The tufts 12 are attached to the body by forming a hole in the latter and then setting such tufts in the hole by suitable adhesive means, such as rubber cement or the like.

The body 1 is fixed on opposite sides, and at its lower edge rearwardly of the notch 7, with forwardly opening hooks; the side hooks being shown at 13 and the bottom hook at 14. Certain of the tufts 12 are disposed directly ahead of the hooks 13 and 14 and flare outwardly and rearwardly directly ahead of said hooks in protective relation to the latter, whereby to fend weeds, moss, and similar obstructions from said hooks. Additionally, another of said tufts extends from the bottom edge of the body ahead of notch 7 at a downward and rearward incline in protective relation to the spinner 10.

While the present embodiment includes two side hooks 13, and a single bottom hook 14, additional hooks, together with corresponding tufts or hackles 12, may be employed, if desired.

When the above described lure is in use it is cast or trolled in the conventional manner of casting or trolling for fish, the lure being primarily designed for surface or near-surface fishing, but may be used in deep water by attachment of a sinker to the line or leader.

The spinner 10, in addition to its function as a fish attracting element, also serves to balance the lure body 1 in the water, whereby said body assumes a life-like position as it moves freely through the water on the end of the leader. The wobble plate 6 serves, as hereinbefore indicated, as a means to impart a wobble motion to the lure, i. e. a motion closely simulating the muscle action of a natural bait fish. In other words, the wobble plate causes the lure to have a slightly jerky side to side movement when being retrieved by a reel or trolled through the water, creating a commotion in the water whereby game fish strike at the lure.

From the foregoing description it will be readily seen that there has been produced such a device as substantially fulfills the objects of the invention as set forth herein.

While this specification sets forth in detail the present and preferred construction of the device, still in practice such deviations from such detail may be resorted to as do not form a departure from the spirit of the invention, as defined in the appended claim.

Having thus described the invention, the following is claimed as new and useful, and upon which Letters Patent are desired:

A fish lure comprising a body, means at the front end of the body for attachment to fishing tackle, the body intermediate its ends having a relatively deep notch cut upwardly from its lower edge and open from side to side of the body, a wire extending across the notch lengthwise of the body at the bottom thereof and a free turning spinner mounted on the wire; the diameter of the spinner being considerably greater than the width of the body whereby as the spinner rotates it will be visible outwardly of the body on both sides thereof as well as below the same.

THOMAS W. WATKINS, Sr.

REFERENCES CITED

The following references are of record in the file of this patent:

UNITED STATES PATENTS

| Number | Name | Date |
| --- | --- | --- |
| 570,632 | Hastings | Nov. 3, 1896 |
| 974,493 | Immell | Nov. 1, 1910 |
| 990,984 | Immell | May 2, 1911 |
| 1,530,835 | Koepke | Mar. 24, 1925 |
| 1,762,914 | Cornelius | June 10, 1930 |
| 1,773,561 | Wethall | Aug. 19, 1930 |
| 1,884,053 | McGarraugh | Oct. 25, 1932 |
| 1,948,005 | Pflueger | Feb. 20, 1934 |
| 2,134,401 | Harvey | Oct. 25, 1938 |
| 2,184,031 | Wyatt | Dec. 19, 1939 |
| 2,236,023 | Turner | Mar. 25, 1941 |